(12) United States Patent
Guzman et al.

(10) Patent No.: US 10,545,259 B2
(45) Date of Patent: Jan. 28, 2020

(54) OPTOMECHANICAL GRAVIMETER

(71) Applicant: Government of the United States of America, as Represented by the Secretary of Commerce, Gaithersburg, MD (US)

(72) Inventors: Felipe Guzman, Derwood, MD (US); Lee Michael Kumanchik, Brandon, FL (US); Jacob M. Taylor, Washington, DC (US); Jon R. Pratt, Clarksburg, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 15/634,547

(22) Filed: Jun. 27, 2017

(65) Prior Publication Data
US 2017/0371065 A1 Dec. 28, 2017

Related U.S. Application Data

(60) Provisional application No. 62/355,208, filed on Jun. 27, 2016.

(51) Int. Cl.
*G01V 7/04* (2006.01)
*G01P 15/093* (2006.01)
*G01P 21/00* (2006.01)

(52) U.S. Cl.
CPC ............. *G01V 7/04* (2013.01); *G01P 15/093* (2013.01); *G01P 21/00* (2013.01)

(58) Field of Classification Search
CPC .......... G01V 7/04; G01V 7/00; G01P 15/093; G01P 21/00
(Continued)

(56) References Cited

U.S. PATENT DOCUMENTS 5,728,935 A * 3/1998 Czompo ................. G01V 7/16
73/382 G

OTHER PUBLICATIONS

Oliver Gerberding, et al., Optomechanical reference accelerometer, Metrologia, 2015, 654-665, 52.
(Continued)

*Primary Examiner* — Robert R Raevis
(74) *Attorney, Agent, or Firm* — Office of Chief Counsel for National Institute of Standards and Technology (57) ABSTRACT

An optomechanical gravimeter includes: a first and second accelerometer; and a spacer member interposed between the first accelerometer and the second accelerometer such that the first accelerometer and the second accelerometer independently include: a basal member; a test mass disposed on the basal member; a flexural member interposed between the basal member and the test mass such that the test mass is moveably disposed on the basal member via flexing of the flexural member; an armature disposed on the basal member and opposing the test mass and the flexural member such that: the armature is spaced apart from the test mass; a cavity including: a first mirror disposed on the test mass; a second mirror disposed on the armature, the spacer member providing a substantially constant distance of separation between a first measurement point of the first accelerometer and a second measurement point of the second accelerometer.

14 Claims, 12 Drawing Sheets

(58) Field of Classification Search
USPC ... 73/514.19, 514.26, 514.27, 382 G, 382 R; 356/496–506, 614, 625
See application file for complete search history.

(56) References Cited

OTHER PUBLICATIONS

John Melcher, et al., A self-calibrating optomechanical force sensor with femtonewton resolution, Appl. Phys. Lett., 2014, 233109, 105.

Felipe Guzman Cervantes, et al., High sensitivity optomechanical reference accelerometer over 10 kHz, Applied Physics Letters, 2014, 221111, 104.

Alexander G. Krause, et al., A microchip optomechanical accelerometer, Physics Optics, 2012.

D.N. Hutchison, et al., Z-axis optomechanical accelerometer, IEEE, 2012.

Mario Mangold, et al., Pulse repetition rate scaling from 5 to 100 GHz with a high-power semiconductor disk laser, Optics Express, 2014, 6099-6107, 22 (5).

N. Laurand, et al., Fiber-tunable dilute-nitride VCSEL, Phys. Stat. Sol., 2005, 3895-3898, 11.

A. Bousseksou, et al., Wavelength tunable InP-based EP-VECSEL operating at room tempterature and in CW at 1.55 μm, Electronics Letters, 2004, 40(23).

\* cited by examiner

OPTOMECHANICAL GRAVIMETER

CROSS REFERENCE TO RELATED APPLICATIONS

This application claims the benefit of U.S. Provisional Patent Application Ser. No. 62/355,208, filed Jun. 27, 2016, the disclosure of which is incorporated herein by reference in its entirety.

STATEMENT REGARDING FEDERALLY SPONSORED RESEARCH

This invention was made with United States Government support from the National Institute of Standards and Technology, an agency of the United States Department of Commerce. The Government has certain rights in the invention.

BRIEF DESCRIPTION

Disclosed is an optomechanical gravimeter comprising: a gravimetry axis; a first accelerometer disposed along the gravimetry axis and that measures a first acceleration of the first accelerometer; a second accelerometer disposed along the gravimetry axis opposing the first accelerometer and that measures a second acceleration of the second accelerometer; and a spacer member disposed along the gravimetry axis and interposed between the first accelerometer and the second accelerometer such that the spacer member is in mechanical communication with the first accelerometer and the second accelerometer, the first accelerometer and the second accelerometer independently comprising: a basal member; a test mass disposed on the basal member; a flexural member interposed between the basal member and the test mass such that the test mass is moveably disposed on the basal member via flexing of the flexural member; an armature disposed on the basal member and opposing the test mass and the flexural member such that: the armature is spaced apart from the test mass, and the basal member and the armature are subject to identical displacement; a cavity comprising: a first mirror disposed on the test mass; a second mirror disposed on the armature and in optical communication with the first mirror; an optical coupler in optical communication with the second mirror and that provides laser light to the cavity; and a cavity length comprising a distance between the first mirror and the second mirror, the first accelerometer further comprising: a first displacement axis that is collinear with the test mass of the first accelerometer and the cavity of the first accelerometer, the test mass of the first accelerometer being displaced along the first displacement axis in response to flexing of the flexural member of the first accelerometer; and a first measurement point disposed on the test mass of the first accelerometer along the first displacement axis; the second accelerometer further comprising: a second displacement axis that is collinear with the test mass of the second accelerometer and the cavity of the second accelerometer, the test mass of the second accelerometer being displaced along the second displacement axis in response to flexing of the flexural member of the second accelerometer; and a second measurement point disposed on the test mass of the second accelerometer along the second displacement axis; the spacer member providing a substantially constant distance of separation between the first measurement point of the first accelerometer and the second measurement point of the second accelerometer.

Also disclosed is a process for performing gravimetry, the process comprising: providing an optomechanical gravimeter; producing a first displacement signal by the first accelerometer; producing a second displacement signal by the second accelerometer; calibrating the first displacement signal to provide a calibrated first displacement signal; calibrating the second displacement signal to provide a calibrated second displacement signal; determining a numerical average between the calibrated first displacement signal and the calibrated second displacement signal to perform gravimetry.

Also disclosed is a process for performing gradiometry, the process comprising: providing an optomechanical gravimeter; producing a first displacement signal by the first accelerometer; producing a second displacement signal by the second accelerometer; calibrating the first displacement signal to provide a calibrated first displacement signal; calibrating the second displacement signal to provide a calibrated second displacement signal; determining a numerical difference between the calibrated first displacement signal and the calibrated second displacement signal; and determining a gradiometric signal by referencing the numerical difference to the distance between the first measurement point and the second measurement point to perform gradiometry.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been discovered that an optomechanical gravimeter herein can include, e.g., a monolithic fused-silica parallel-leaf flexure oscillator that incorporates a highly compact optical interferometer as a high-resolution test mass displacement sensor. The optomechanical gravimeter can reach an acceleration noise floor on the order of $10^{-10}$ meters square seconds per hertz (m s$^2$/Hz), e.g., in the frequency range of 1 millihertz (mHz) to 1 hertz (Hz). Accordingly, the optomechanical gravimeter has utility for geophysical, gravitational, space science, and the like applications. Moreover, the optomechanical gravimeter can be used in an environment such as oil and mineral industries to identify wells or exploration locations or mining locations.

Figure 1:
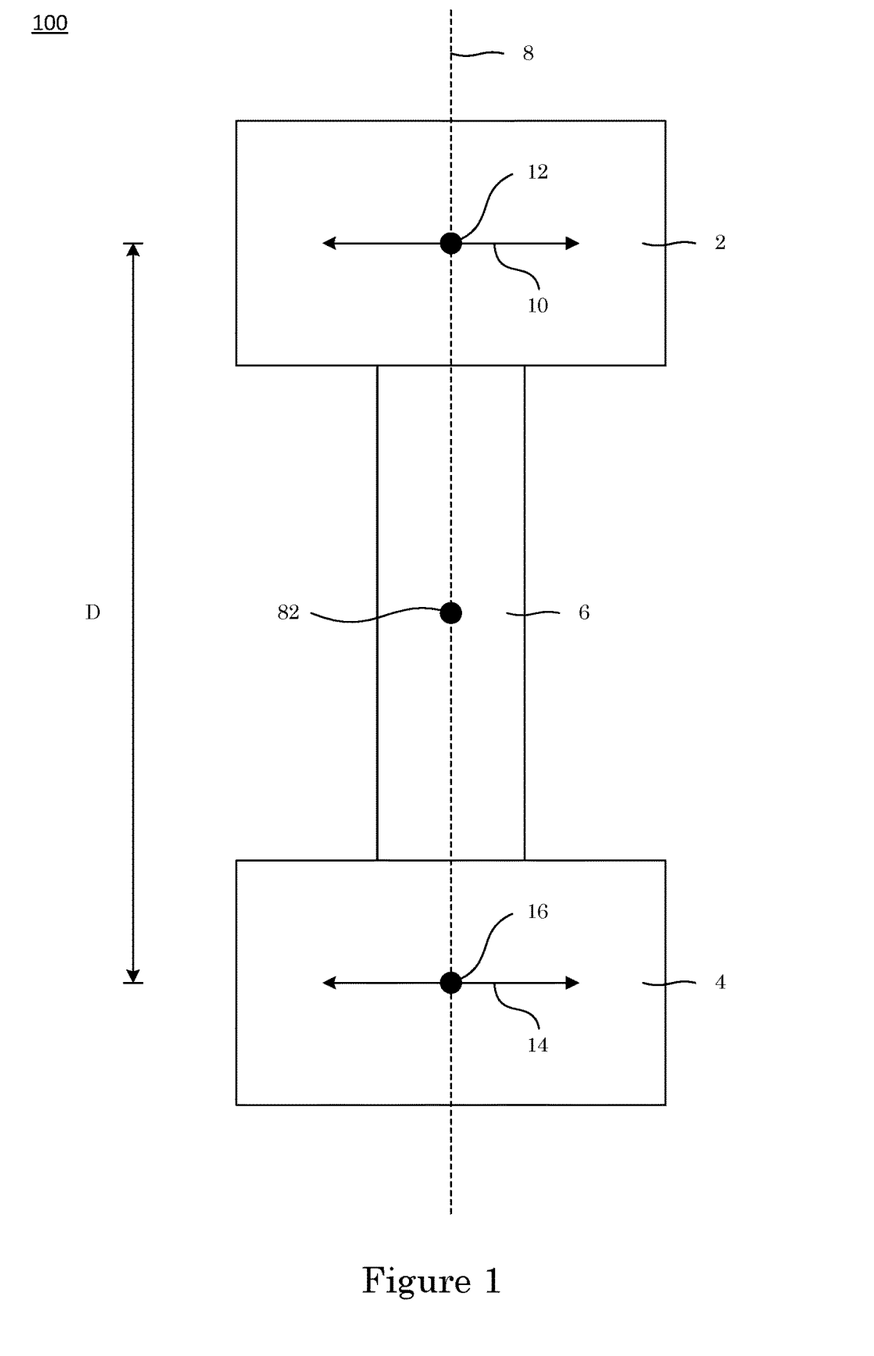
FIG. 1 shows an optomechanical gravimeter.
Figure 2:
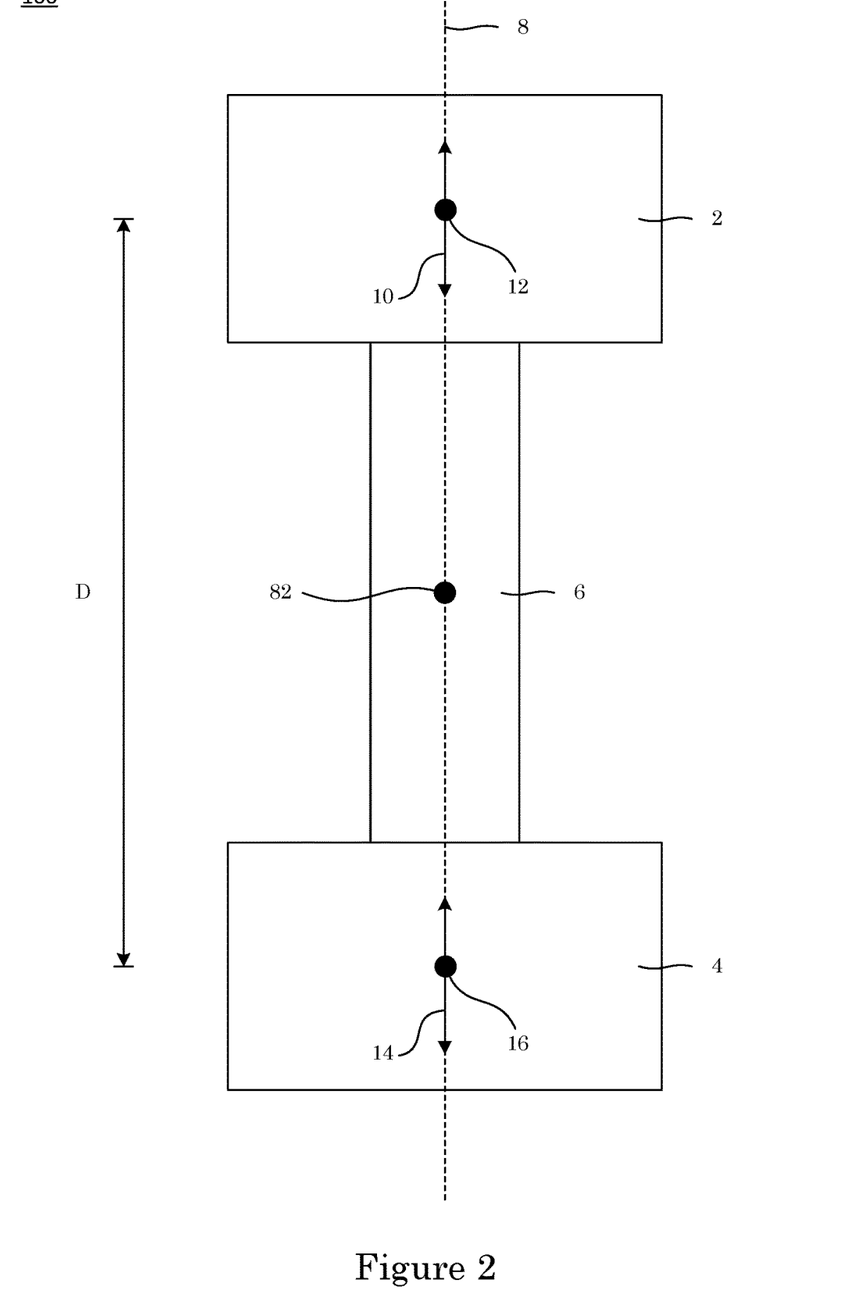
FIG. 2 shows an optomechanical gravimeter.

In an embodiment, with reference to FIG. 1 and FIG. 2, optomechanical gravimeter 100 includes gravimetry axis 8; first accelerometer 2 disposed along gravimetry axis 8 and that measures a first acceleration of first accelerometer 2; second accelerometer 4 disposed along gravimetry axis 8 opposing first accelerometer 2 and that measures a second acceleration of second accelerometer 4; and spacer member 6 disposed along gravimetry axis 8 and interposed between first accelerometer 2 and second accelerometer 4 such that spacer member 6 is in mechanical communication with first accelerometer 2 and second accelerometer 4. First accelerometer 2 includes first displacement axis 10 and first measurement point 12 disposed along first displacement axis 10. Second accelerometer 4 includes second displacement axis 14 and second measurement point 16 disposed along the second displacement axis 14. Here, spacer member 6 provides a substantially constant distance D of separation between the measurement point 12 of first accelerometer 2 and second measurement point 16 of second accelerometer 4. Further, first measurement point 12 and second measurement point 16 are collinear with gravimetry axis 8. Spacer member 6 Includes center of expansion 82, which can be collinear with gravimetry axis 8. Is contemplated that distance D can be on the order of 1 cm to 100 cm.

Figure 3:
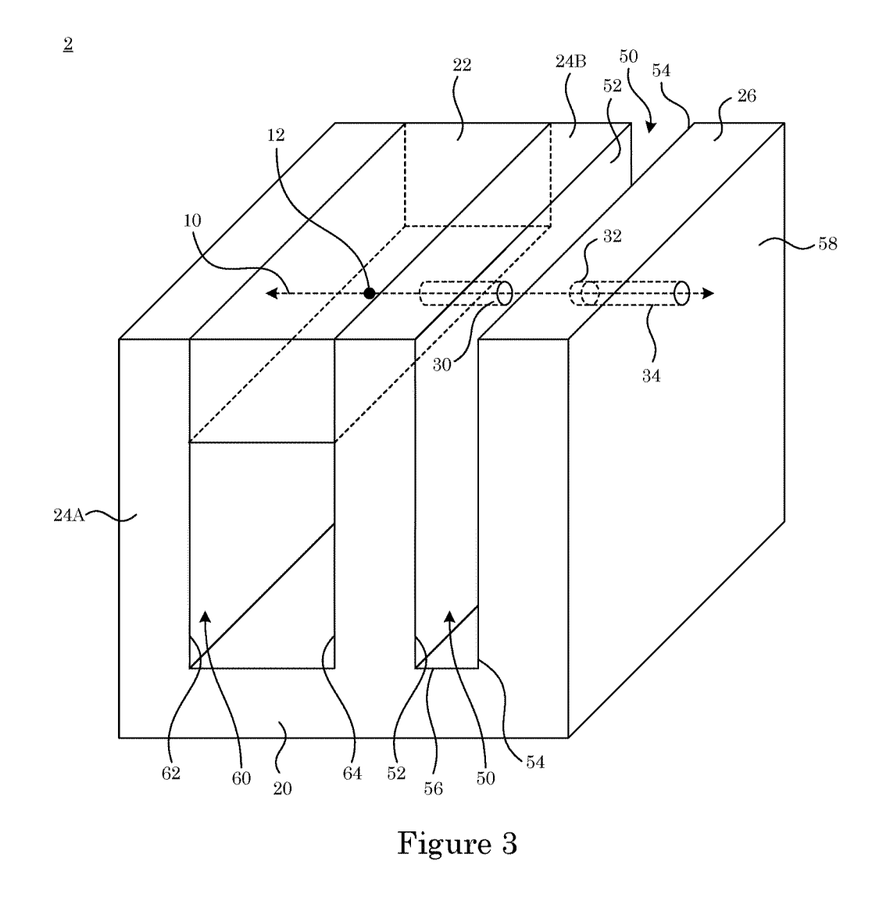
FIG. 3 shows a perspective view of an optomechanical gravimeter.
Figure 4:
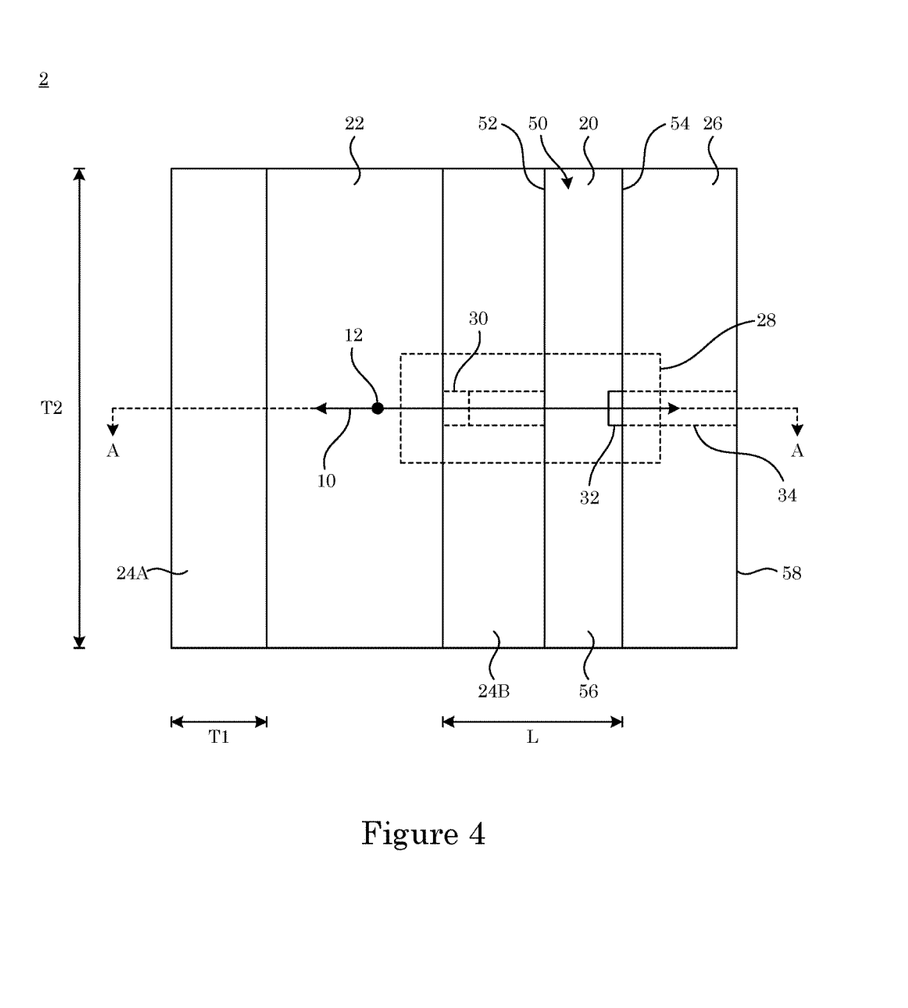
FIG. 4 shows a top view of the optomechanical gravimeter shown in FIG. 3.
Figure 5:
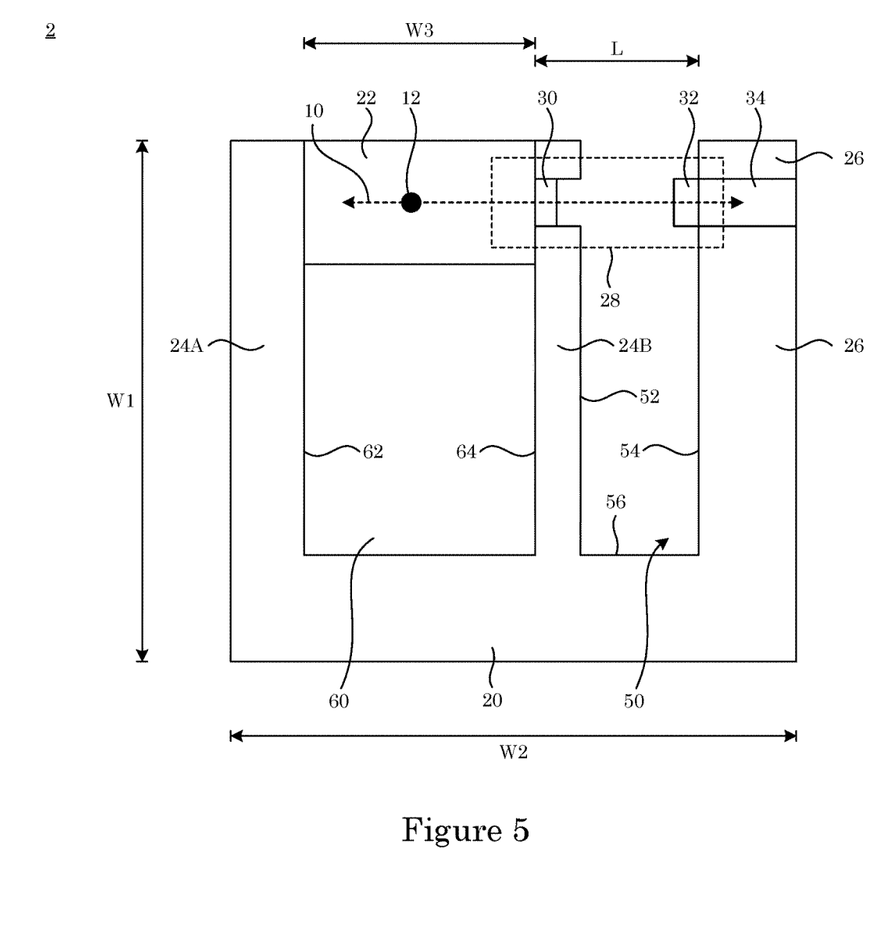
FIG. 5 shows a cross-section along line A-A of the optomechanical gravimeter shown in FIG. 4.

In an embodiment, with reference to FIG. 3, FIG. 4, and FIG. 5, first accelerometer 2 and second accelerometer 4 independently include: basal member 20; test mass 22 disposed on basal member 20; flexural member 24 (e.g., 24A, 24B) interposed between basal member 20 and test mass 22 such that test mass 22 is moveably disposed on basal member 20 via flexing of flexural member 24; armature 26 disposed on basal member 20 and opposing test mass 22 and flexural member 24B such that: armature 26 is spaced apart from test mass 22, and basal member 20 and armature 26 are subject to identical displacement (i.e., basal member 20 and armature 26 move in synchrony); cavity 28 including: first mirror 30 disposed on test mass 22; second mirror 32 disposed on armature 26 and in optical communication with first mirror 30; optical coupler 34 in optical communication with second mirror 32 and that provides laser light to cavity 28; and cavity length L that is a length of the distance between first mirror 30 and second mirror 32. Here, first accelerometer 2 includes first displacement axis 10 that is collinear with test mass 22 of first accelerometer 2 and cavity 28 of first accelerometer 2 such that test mass 22 of first accelerometer 2 is displaced along first displacement axis 10 in response to flexing of flexural member 24 of first accelerometer 2. Additionally, first accelerometer includes first measurement point 12 disposed on test mass 22 of first accelerometer 2 along first displacement axis 10. Further, second accelerometer 4 includes second displacement axis 14 that is collinear with test mass 22 of second accelerometer 4 and cavity 28 of second accelerometer 4, wherein test mass 22 of second accelerometer 4 is displaced along second displacement axis 14 in response to flexing of flexural member 24 of second accelerometer 4. Second accelerometer 4 also includes second measurement point 16 disposed on test mass 22 of second accelerometer 4 along second displacement axis 14.

Armature 26 and flexural member 24B are spaced apart by gap 50 bounded by walls (52, 54, 56). Similarly, flexural members (24A, 24B) are separated by gap 60 bounded by walls (62, 64). Gap 60 can be from 1 mm to 20 mm. Further, cavity length L can be 20 to 400 μm. Gap 50 can be from 10 μm to 2 mm.

Flexural member 24 can be a leaf spring that has an anisotropic aspect ratio with respect to dimensions of its thicknesses. Here, flexural member 24 can have first thickness T1 from 10 μm to 1000 μm. Additionally, flexural member 24 can have second thickness T2, at least 8 times larger than T1, from 80 μm to 8 mm.

Dimensions of optomechanical gravimeter 100 can include first width W1 and second width W2 independently from 1 mm to 10 cm. Moreover, test mass 22 can have width W3 from 1 mm to 1 cm.

Displacement axes (10, 14) can be arranged in a plurality of geometrical configurations to provide determination of a gradient e.g., in acceleration. In an embodiment of optomechanical gravimeter 100, first displacement axis 10 of first accelerometer 2 and second displacement axis 14 of second accelerometer 4 are orthogonal to gravimetry axis 8 as shown in FIG. 1. In an embodiment of optomechanical gravimeter 100, first displacement axis 10 of first accelerometer 2 and second displacement axis 14 of second accelerometer 4 are collinear with gravimetry axis 8 as shown in FIG. 2.

Figure 6:
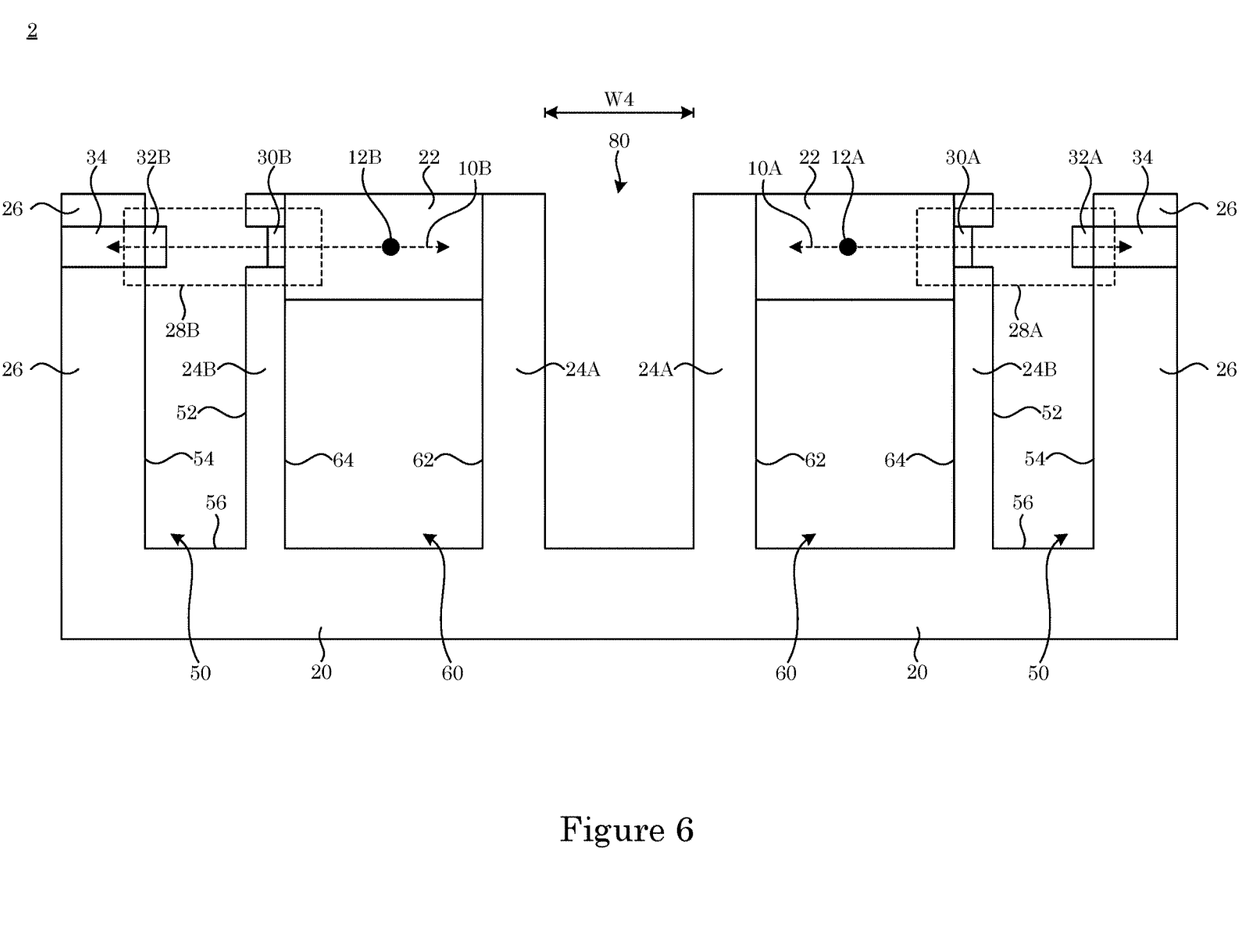
FIG. 6 shows an optomechanical gravimeter.

In an embodiment, with reference to FIG. 6, accelerometer (2 or 4) includes a plurality of accelerometers (e.g., primary accelerometer 2A and auxiliary accelerometer 2B) that are spaced apart by 80. By including the plurality of accelerometers, optomechanical gravimeter 100 can be used to measure the gravitational gradient across the separation D between the sensors.

Figure 7:
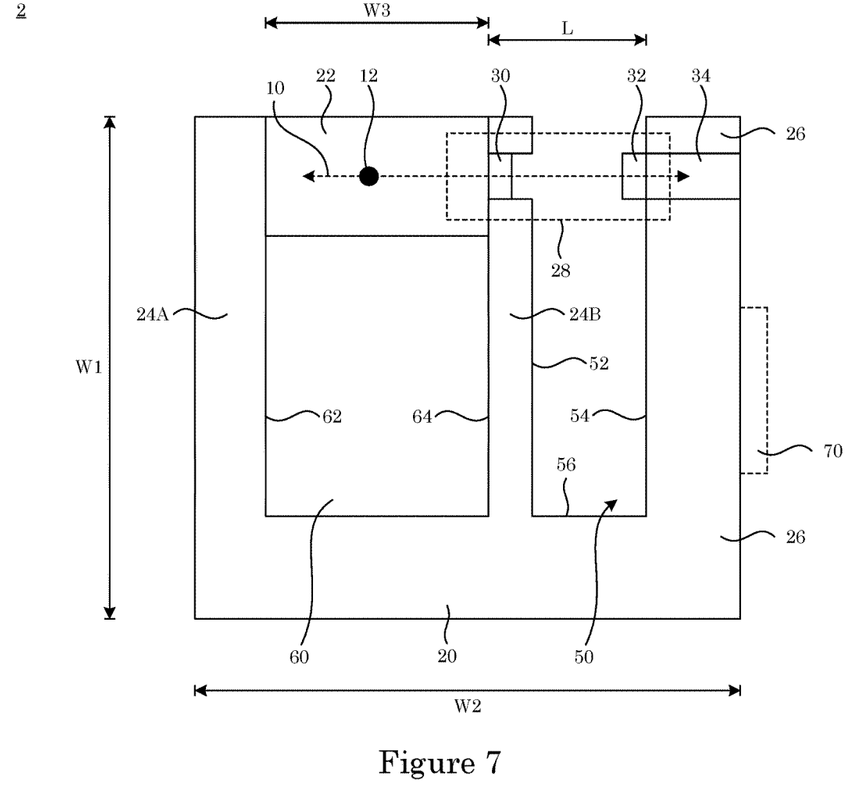
FIG. 7 shows an optomechanical gravimeter.

In an embodiment, with reference to FIG. 7, accelerometer (2 or 4) includes piezoelectric member 70 disposed on armature 26. Here, piezoelectric member 70 receives a voltage and dynamically adjusts optical cavity length L to maintain an optical resonance of cavity 28 and to produce a proportional voltage signal that corresponds to changes to cavity length L, which can be used for control or readout. Accordingly, piezoelectric member 70 provides selectively adjusts gap 50 of accelerometer (2 or 4) such that an optical resonance of cavity 28 can be maintained and diagnostic information provided.

Figure 8:
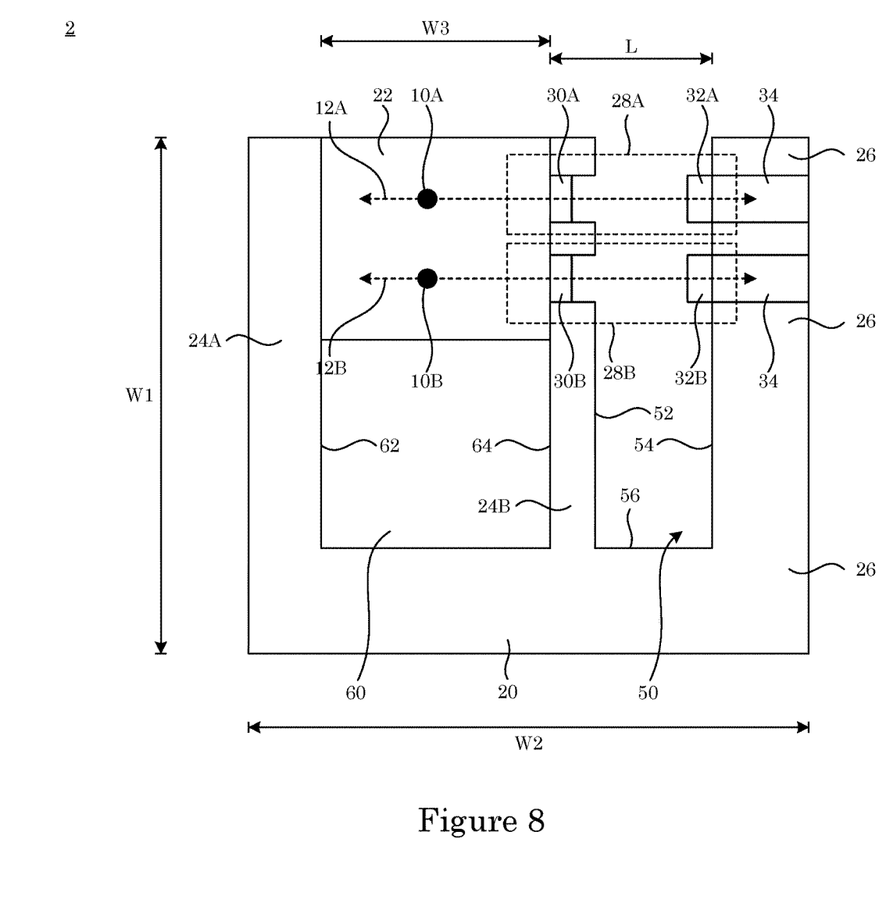
FIG. 8 shows an optomechanical gravimeter.

In an embodiment, with reference to FIG. 8, accelerometer (2 or 4) includes second cavity 28B that includes third mirror 30B and fourth mirror 32B opposing third mirror 30B. third mirror 30B is disposed on test mass 22 proximate to first mirror 30A, and fourth mirror 32B is disposed on armature 26 proximate to second mirror 32. Second cavity 28B provides an auxiliary displacement measurement of test mass 22, which can be used for noise cancellation purposes due to a common-mode effect; or for redundancy.

In optomechanical gravimeter 100, test mass 22 can be a gravitational inertial sensor. It is contemplated that test mass 22 can include a material selected for disposition of first mirror 30 thereon. Exemplary materials for test mass 22 include a metal, polymer, glass, ceramic, semiconductor, metalloid, main group element, non-metal element, an electrical insulator, an electrical conductor, and the like, or a combination thereof. In an embodiment, test mass 22 includes silica. A mass of test mass 22 can be depend on a material property (e.g., a density) and can be, e.g., from 100 milligrams (mg) to 100 g.

Figure 9:
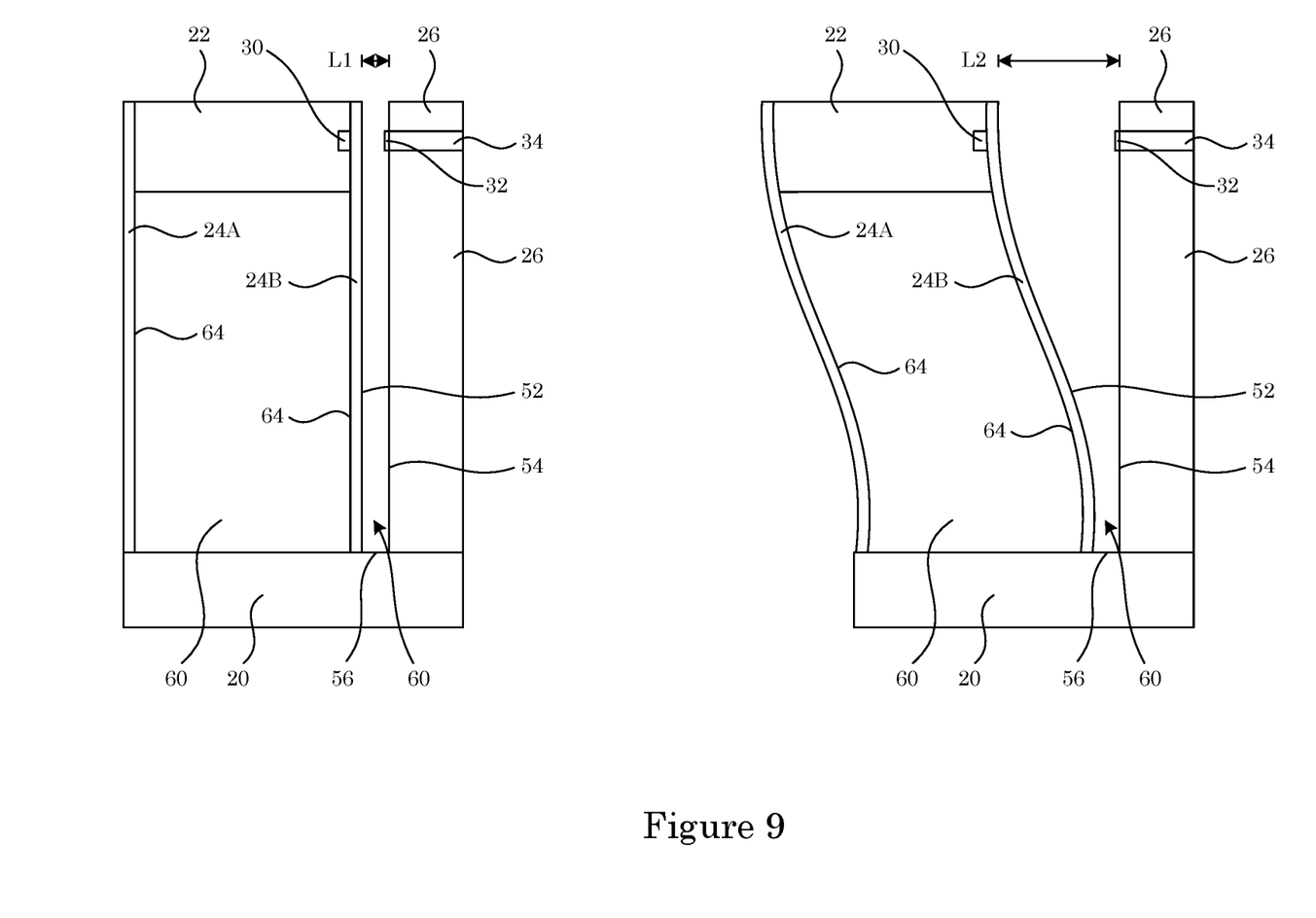
FIG. 9 shows a flexing of a flexural member of an optomechanical gravimeter.

In optomechanical gravimeter 100, test mass 22 is disposed on flexural member 24. As shown in FIG. 9, flexural member 24 provides a restoring force to test mass 22 relative to basal member 20 and provides a uniaxial response of displacement to acceleration. In panel A of FIG. 9, cavity 28 of accelerometer (2 or 4) has first cavity length L1 with flexural members (24A, 24B) at a non-flexed rest position. In panel B of FIG. 9, cavity 28 of accelerometer (2 or 4) has second cavity length L2 that is greater than L1 with flexural members (24A, 24B) at a flexed tension position. It is contemplated that cavity length L can be less than first cavity length L1. In this regard, a length of cavity length L can be from 20 to 400 μm.

Flexural member 24 can include a material so that flexural member 24 has a Young's modulus to provide a selected amplitude of displacement of test mass 22 relative to armature 26. The Young's modulus of flexural member 24 can be from 50 to 500 GPa. Exemplary materials for flexural member 24 include a metal, polymer, glass, ceramic, semiconductor, metalloid, main group element, non-metal element, an electrical insulator, an electrical conductor, and the like, or a combination thereof. Flexural member 24 can be a same or different material then that of test mass 22. In an embodiment, flexural member 24 includes silica. A mass of flexural member 24 can be from 10 mg to 100 g In optomechanical gravimeter 100, test mass 22, flexural member 24, and armature 26 are disposed on basal member 20. Basal member 20 provides a reference position to compare to a position of test mass 22. It is contemplated that basal member 20 can include a material selected for rigidity of coupling of cavity 28 of first accelerometer 2 to cavity 28 of second accelerometer 4 through spacer member 6. Exemplary materials for basal member 20 include a metal, polymer, glass, ceramic, semiconductor, metalloid, main group element, non-metal element, an electrical insulator, an electrical conductor, and the like, or a combination thereof. In an embodiment, basal member 20 includes silica. A mass of basal member 20 can be from a mass of test mass 22 to up to 100 times the mass of test mass 22.

Displacement of test mass 22 along displacement axis (e.g., 10 or 14) changes cavity length L of cavity 28. In optomechanical gravimeter 100, first mirror 30 provides a reference point for reflected light and estimates the position of the test mass. It is contemplated that first mirror 30 can include a material selected for reflection of laser light therefrom. Exemplary materials for first mirror 30 include fused-silica, quartz, a lithium-aluminosilicate glass-ceramic (e.g., commercially available under trademark ZERODUR), a glass ceramic, and the like, or a combination thereof. In an embodiment, first mirror 30 is formed on a laser-ablated surface of an optical mirror and then coated with a high-reflectivity dielectric mirror or a moderate reflectivity metal surface. Further, first mirror 30 can be concave for alignment of laser light into cavity 28.

Second mirror 32 receives laser light from an external light source and communicates the laser light to the first mirror 30 as part of cavity 28. In this manner, second mirror 32 in combination with first mirror provides an optical cavity whose length is determined in part by the position of test mass 22. It is contemplated that second mirror 32 can include a material selected for communication of laser light therethrough. Exemplary materials for second mirror 32 can be a same material as first mirror 30, and the like, or a combination thereof. In an embodiment, second mirror 32 includes the same material as that of first mirror 30. Second mirror can be planar with a lower reflectivity than first mirror 30.

Cavity 28 that includes first mirror 30 and second mirror 32 optically connects the position of test mass 22 and a resonant wavelength of cavity 28. Cavity 28 can have a free spectral range from 5 to 1000 GHz. The wavelength of laser light communicated in cavity 28 can be from 400 nm to 2.0 μm, specifically from 1.5 μm to 1.6 μm.

In optomechanical gravimeter 100, spacer member 6 provides a controlled separation between accelerometers (2, 4). It is contemplated that spacer member 6 can include a material selected for rigid and essentially constant distance of separation of first accelerometer 2 and second accelerometer for. Exemplary materials for spacer member 6 include a metal, polymer, glass, ceramic, semiconductor, metalloid, main group element, non-metal element, an electrical insulator, an electrical conductor, and the like, or a combination thereof. In an embodiment, spacer member 6 includes silica. A mass of spacer member 6 can be from 3 g to 1 kg. Further, spacer member 6 can be situated to have minimal thermal or mechanical length changes when mounted near center of expansion 82.

In an embodiment, a process for making optomechanical gravimeter 100 includes making first accelerometer 2; making second accelerometer 4; making spacer member 6; disposing first accelerometer 2 on spacer member 6; and disposing second accelerometer 4 on spacer member 6 to form optomechanical gravimeter 100.

Making accelerometer (2, 4) can include preparing a precise CAD drawing in which physical dimensions provide precise values for a mechanical resonance frequency and oscillating mass (effective stiffness). In this manner, a thermally limited acceleration noise floor is selected for accelerometer (2, 4). Accelerometer (2, 4) can be made by 3D printing in fused-silica.

Making spacer member 6 can include preparing a precise CAD drawing in which physical dimensions provide precise values for thermal expansion and mechanical deflection. In this manner, a point of high length stability is selected for thermally limited gradiometric detection.

Disposing accelerometer (2, 4) can include mounting on the assembly facility which consists of an appropriate microscope and micro-positioning stages to accurately handle fiber optics. Fiber optic cables are processed such that it is possible to obtain a micro-mirror by cleaving them and, if needed, applying dielectric or metallic reflective coatings on their surface.

Mounting the micro-optics on engraved V-grooves which help align the a micrometric (40-400 μm) Fabry-Pérot interferometer between the frame and test mass 22 to monitor the dynamics of the mechanical oscillator. The micro-positioning stages are used to optimize the alignment the interferometer alignment. In order to achieve an optimal alignment, appropriate test laser optic, fiber-optic, optoelectronic and signal visualization equipment are used to tune the cavity alignment according to the measured reflected signal. Gluing the fiber cables is accomplished using UV-curing epoxy and shining UV light onto the assembly.

According to an embodiment, a process for making optomechanical gravimeter 100 includes taking a calibrated, single axis accelerometer whose output is given in $m/s^2$ and mounting this accelerometer on a fixed platform with known inertial trajectory, provided possibly by inertial navigation systems.

According to an embodiment, a process for making optomechanical gravimeter 100 includes taking two functioning, calibrated, single axis accelerometers whose calibrated output is given in $m/s^2$. These accelerometers are mounted using gluing or other bonding techniques to the spacer member, taken to be an ultra-low expansion mechanically stable material such as a ULE bar, to provide a stable spacing D between the point-of-measurement for both accelerometers, and a stable common direction such that the single axes of detection are parallel for both accelerometers.

Optomechanical gravimeter 100 has numerous beneficial uses, including gravimetry. In an embodiment, a process for performing gravimetry includes: providing optomechanical gravimeter 100; producing a first displacement signal by first accelerometer 2; producing a second displacement signal by second accelerometer 4; calibrating the first displacement signal to provide a calibrated first displacement signal; calibrating the second displacement signal to provide a calibrated second displacement signal; determining a numerical difference between the calibrated first displacement signal and the calibrated second displacement signal; and determining a gradiometric signal by referencing the numerical difference to distance D between the first measurement point and the second measurement point to perform gravimetry.

In an embodiment, the process for performing gravimetry further includes determining a physical expansion of the optomechanical gravimeter; and correcting the gradiometric signal based on the physical expansion. According to an embodiment, the process for performing gravimetry further includes filtering the gradiometric signal to reject an extraneous noise.

In the process for forming gravimetry, producing the first displacement signal by first accelerometer 2 includes monitoring the cavity resonance with a laser and appropriate homodyne, heterodyne, or spectroscopic resolution of the change in resonance frequency.

In the process for forming gravimetry, producing a second displacement signal by second accelerometer 4 follows the same process as for accelerometer 2, using either shared or separate sources, detectors, and analysis.

In the process for forming gravimetry, calibrating the first displacement signal to provide a calibrated first displacement signal includes referencing the cavity resonance signal with a known resonance frequency provided by a stable laser or by spectroscopic tools. This referenced frequency change is then, via calibration, converted to a length displacement. This is divided by the square of the in-situ estimation of the mechanical resonance frequency or known mechanical resonance response including damping corrections to provide an estimate of the acceleration.

In the process for forming gravimetry, calibrating the second displacement signal to provide a calibrated second displacement signal follows the same process as for the first calibrated signal.

In the process for forming gravimetry, determining a numerical difference between the calibrated first displacement signal and the calibrated second displacement signal includes subtraction of the reduced, calibrated values.

In the process for forming gravimetry, determining a gradiometric signal by referencing the numerical difference to distance D between the first measurement point and the second measurement includes dividing the numerical difference by the best estimated value for D.

In the process for forming gravimetry, determining a physical expansion of the optomechanical gravimeter includes calibration of known length variation processes, as well the possibility for in situ monitoring of the separation via optical interferometry.

In the process for forming gravimetry, correcting the gradiometric signal based on the physical expansion includes both simple modification of D to the best estimated value but also inclusion of dynamical effects via vibration analysis.

In the process for forming gravimetry, filtering the gradiometric signal to reject an extraneous noise includes physical mounting with low vibration elements as well as rejection of known noise sources monitored separately.

In the process for gravimetry, tracking the corresponding acceleration as a function of the position of the fixed platform, with the inertial history of the platform subtracted to remove seismic and other vibrational effects. The corresponding signal reflects the acceleration due to gravity. Multiple accelerometers with different principle axes on the same platform can also be realized, leading to full characterization of the gravitational field.

Optomechanical gravimeter 100 has numerous advantageous and beneficial properties. In an aspect, optomechanical gravimeter 100 provides stable calibration via comparison to optical standards.

Optomechanical gravimeter 100 advantageously and unexpectedly is light-weight and compact to provide gravimetric measurements and overcomes a hefty weight of conventional devices that can weigh several kilograms and that can be a size of a backpack, e.g., 270 cm$^3$. Beneficially, optomechanical gravimeter 100 is highly compact and light with an acceleration noise floor on the order of $10^{-10}$ m s$^{-2}$ Hz$^{-1/2}$. A total weight of accelerometer (2, 4) can be about 30 grams, including the optical interferometer that can be constructed out of compact optics to provide in interferometer links from 1 μm to 2 cm and that involves fiber-optics.

The articles and processes herein are illustrated further by the following Example, which is non-limiting.

Example

Sensing Spurious Forces in Low-Earth-Orbit Spacecraft.

This Example describes and optomechanical gravimeter for a spacecraft require that measures spurious forces acting on the spacecraft. The optomechanical gravimeter has high sensitivity at ng/√Hz levels and below, particularly for high accuracy navigation and drag-free flight. Further, the optomechanical gravimeter includes wide bandwidth and self-referencing optomechanical accelerometers that are based on monolithic fused-silica mechanical oscillators with integrated fiber-optic Fabry-Pérot micro-cavities. Accordingly, the accelerometers are sensitive to displacement of a test mass.

Acceleration resolution can involve a thermal fluctuation of the test mass, which are given for a simple harmonic oscillator at high temperature by Equation 1, where m is the test-mass, Q is the mechanical quality factor, T is the temperature of the test mass thermal bath, kB is the Boltzmann's constant, and ω0 is the natural frequency of the mechanical oscillator. Typically, acceleration is obtained from a direct displacement measurement, and both observables are related by the transfer function in Equation 2.

$$a_{th}[\ ] = \sqrt{\frac{4k_B T_0}{mQ}} \quad (1)$$

$$\frac{X[\omega]}{A[\omega]} = -\frac{1}{\omega_0^2 - \omega^2 - i\frac{\omega_0}{Q}\omega} \quad (2)$$

Figure 10:
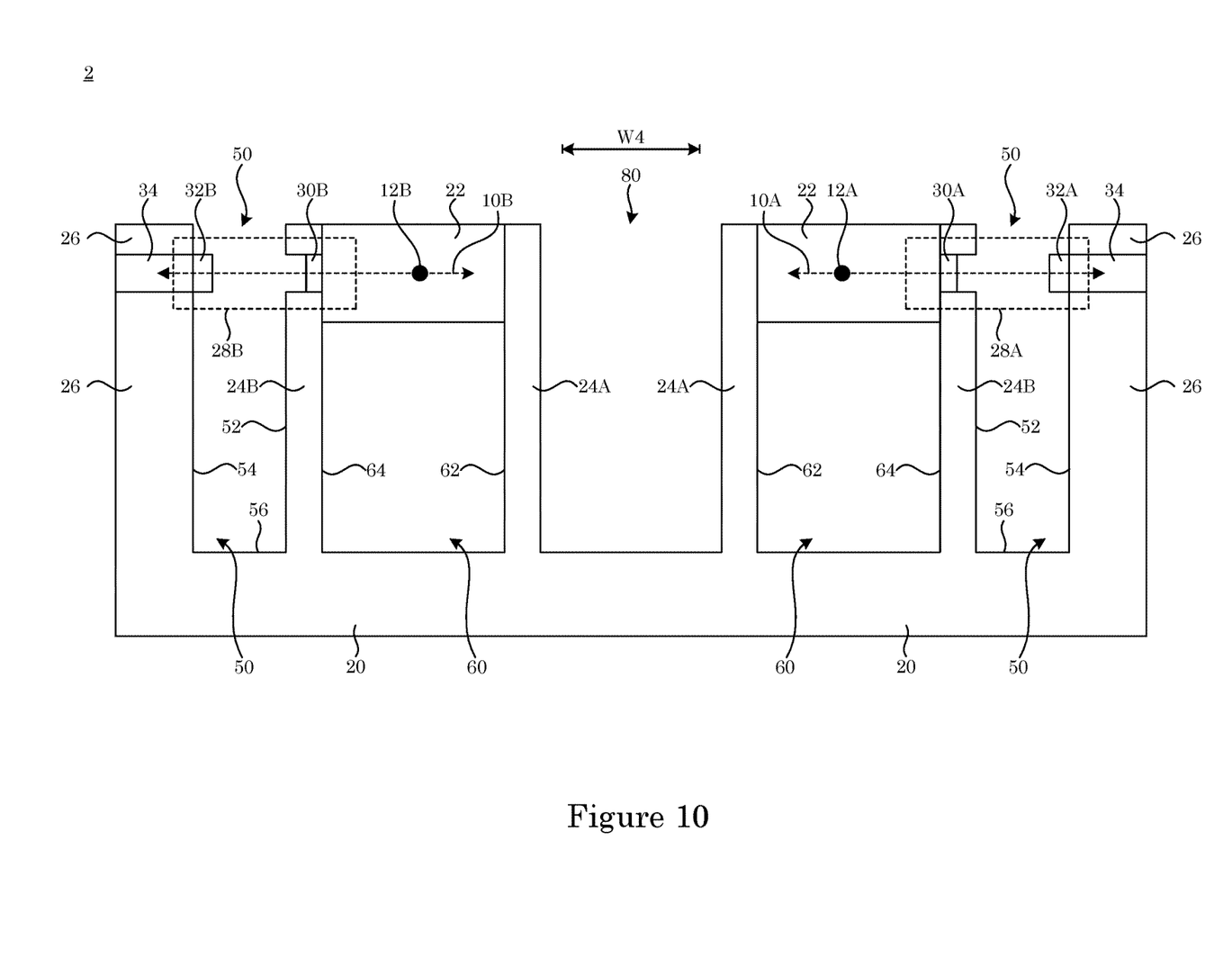
FIG. 10 shows an optomechanical gravimeter.
Figure 11:
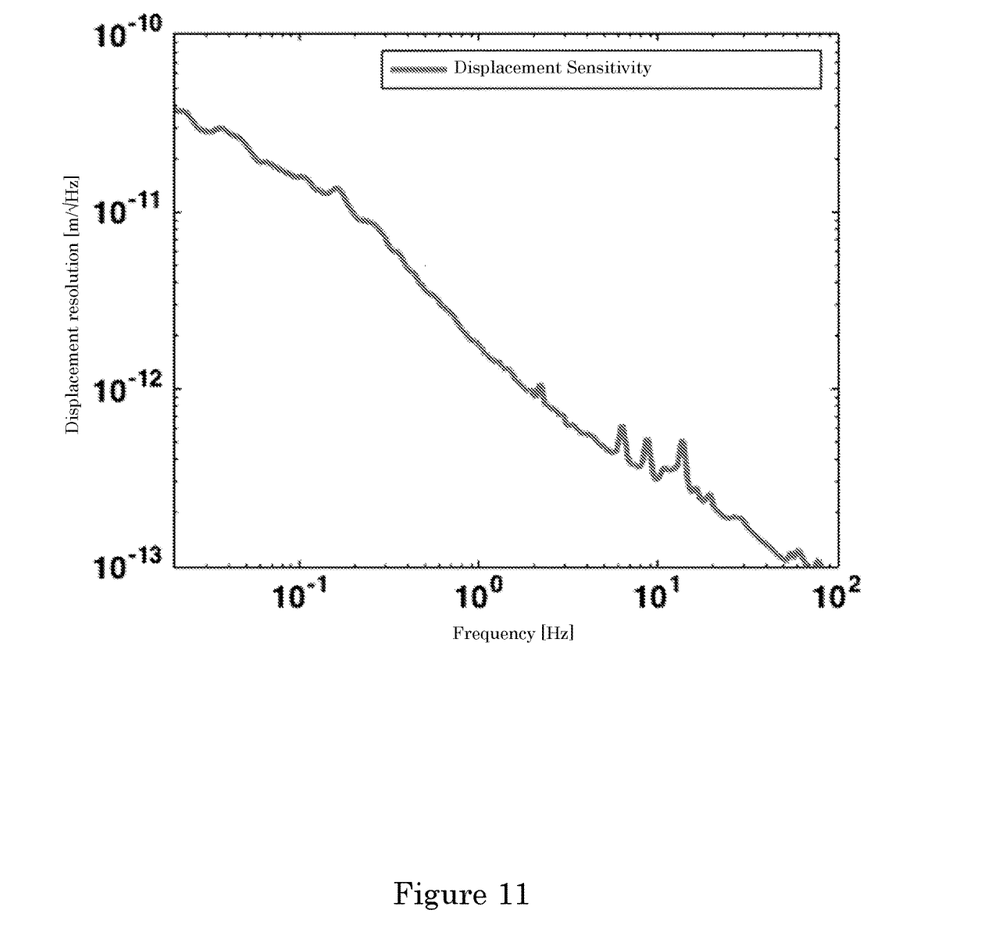
FIG. 11 shows a graph of displacement resolution versus frequency.
Figure 12:
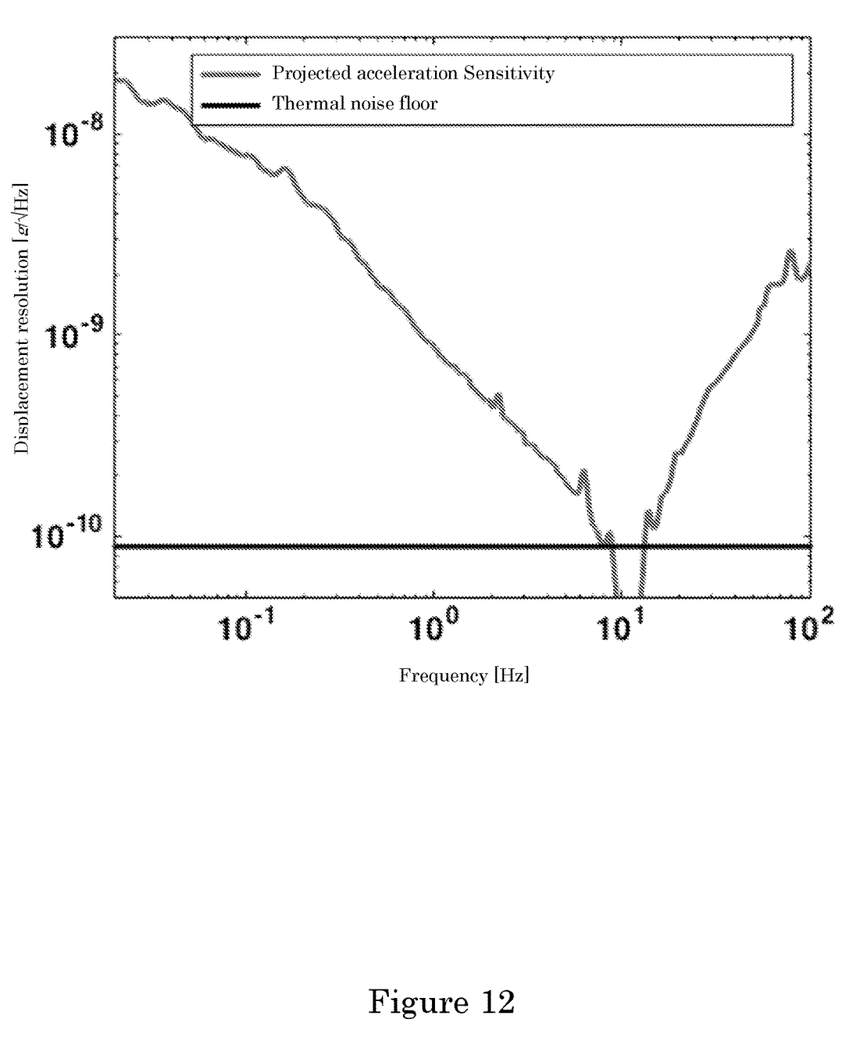
FIG. 12 shows a graph acceleration resolution versus frequency.

The optomechanical accelerometer provides high sensitivity acceleration sensing at lower frequencies and greater bandwidth than conventional systems. FIG. 10 shows an accelerometer. We have run preliminary characterization measurements on the device, resulting in a mechanical resonance frequency ω0=11.14 Hz and a mechanical quality factor Q=2000. This yields a thermal noise floor of 80 pg/√Hz at room temperature. FIG. 11 shows displacement sensitivity data using a 50 μm long fiber-optic Fabry-Pérot interferometer between 10 mHz and 100 Hz, reaching 40

µm/√Hz and 100 fm/√Hz respectively. This test mass displacement sensitivity coupled to the mechanical characteristics of accelerometer provides acceleration sensitivities greater than 10 ng/√Hz above 60 mHz and sub-ng/√Hz levels above 1 Hz as shown in FIG. 12. Moreover, the compact and monolithic design and material selection yield space compatibility.

Lower acceleration sensitivities can be achieved in a twofold approach. The displacement readout performance at lower frequencies can be improved through more stable attachments of the optical elements and by incorporating interferometric balanced detection and an AC readout scheme. By enhancing the connection between the device and mechanical ground plane since the losses at this interface have an impact on Q and the fundamental noise floor of the device.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. An optomechanical gravimeter comprising:
   a gravimetry axis;
   a first accelerometer disposed along the gravimetry axis and that measures a first acceleration of the first accelerometer;
   a second accelerometer disposed along the gravimetry axis opposing the first accelerometer and that measures a second acceleration of the second accelerometer; and
   a spacer member disposed along the gravimetry axis and interposed between the first accelerometer and the second accelerometer such that the spacer member is in mechanical communication with the first accelerometer and the second accelerometer,
   the first accelerometer and the second accelerometer independently comprising:
      a basal member;
      a test mass disposed on the basal member;
      a flexural member interposed between the basal member and the test mass such that the test mass is moveably disposed on the basal member via flexing of the flexural member;
      an armature disposed on the basal member and opposing the test mass and the flexural member such that: the armature is spaced apart from the test mass, and the basal member and the armature are subject to identical displacement;
      an optical cavity comprising:
         a first mirror disposed on the test mass;
         a second mirror disposed on the armature and in optical communication with the first mirror;
         an optical coupler in optical communication with the second mirror and that provides laser light to the optical cavity; and
         a cavity length comprising a distance between the first mirror and the second mirror,
   the first accelerometer further comprising:
      a first displacement axis that is collinear with the test mass of the first accelerometer and the optical cavity of the first accelerometer, the test mass of the first accelerometer being displaced along the first displacement axis in response to flexing of the flexural member of the first accelerometer; and
      a first measurement point disposed on the test mass of the first accelerometer along the first displacement axis;
   the second accelerometer further comprising:
      a second displacement axis that is collinear with the test mass of the second accelerometer and the optical cavity of the second accelerometer, the test mass of the second accelerometer being displaced along the second displacement axis in response to flexing of the flexural member of the second accelerometer; and
      a second measurement point disposed on the test mass of the second accelerometer along the second displacement axis;
   the spacer member providing a substantially constant distance of separation between the first measurement point of the first accelerometer and the second measurement point of the second accelerometer.

2. The optomechanical gravimeter of claim 1, wherein the first displacement axis and the second displacement axis are orthogonal to the gravimetry axis.

3. The optomechanical gravimeter of claim 1, wherein the first displacement axis and the second displacement axis are collinear with the gravimetry axis.

4. The optomechanical gravimeter of claim 1, wherein the accelerometer comprises a single axis accelerometer.

5. The optomechanical gravimeter of claim 4, wherein the single axis accelerometer comprises an optomechanical accelerometer.

6. The optomechanical gravimeter of claim 1, wherein the first accelerometer and the second accelerometer independently comprise a second test mass.

7. The optomechanical gravimeter of claim 1, wherein the flexural member comprises a leaf spring.

8. The optomechanical gravimeter of claim 1, wherein the first accelerometer and the second accelerometer independently further comprise a piezoelectric member disposed on the armature.

9. The optomechanical gravimeter of claim 1, wherein the first accelerometer and the second accelerometer independently further comprise a second optical cavity comprising:
    a third mirror; and
    a fourth mirror.

10. A process for performing gravimetry, the process comprising:
    providing an optomechanical gravimeter of claim 1;
    producing a first displacement signal by the first accelerometer;
    producing a second displacement signal by the second accelerometer;
    calibrating the first displacement signal to provide a calibrated first displacement signal;
    calibrating the second displacement signal to provide a calibrated second displacement signal;
    determining a numerical average between the calibrated first displacement signal and the calibrated second displacement signal to perform gravimetry.

11. The process for performing gravimetry of claim 10, further comprising filtering the gradiometric signal to reject an extraneous noise.

12. A process for performing gradiometry, the process comprising:
    providing an optomechanical gravimeter of claim 1;
    producing a first displacement signal by the first accelerometer;
    producing a second displacement signal by the second accelerometer;
    calibrating the first displacement signal to provide a calibrated first displacement signal;
    calibrating the second displacement signal to provide a calibrated second displacement signal;
    determining a numerical difference between the calibrated first displacement signal and the calibrated second displacement signal; and
    determining a gradiometric signal by referencing the numerical difference to the distance between the first measurement point and the second measurement point to perform gradiometry.

13. The process for performing gravimetry of claim 12, further comprising:
    determining a physical expansion of the optomechanical gravimeter; and
    correcting the gradiometric signal based on the physical expansion.

14. The process for performing gravimetry of claim 12, further comprising:
    filtering the gradiometric signal to reject an extraneous noise.

* * * * *